(12) United States Patent
Miyata (10) Patent No.: US 8,284,256 B2
(45) Date of Patent: Oct. 9, 2012

(54) IMAGING APPARATUS AND COMPUTER READABLE RECORDING MEDIUM

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 1256 days.

(21) Appl. No.: 11/770,114

(22) Filed: Jun. 28, 2007

(65) Prior Publication Data

US 2008/0002028 A1     Jan. 3, 2008

(30) Foreign Application Priority Data

Jun. 30, 2006 (JP) .................................. 2006-181470

(51) Int. Cl.
*G03B 17/00* (2006.01)
(52) U.S. Cl. .......................... 348/169; 396/95; 396/153
(58) Field of Classification Search .................. 348/169; 396/95, 153
See application file for complete search history.

(56) References Cited

U.S. PATENT DOCUMENTS

| | | | |
|---|---|---|---|
| 7,136,581 B2 | 11/2006 | Fujii | |
| 7,433,586 B2* | 10/2008 | Onozawa | 396/121 |
| 7,466,356 B2* | 12/2008 | Hofer | 348/333.02 |
| 7,616,875 B2* | 11/2009 | Uchiyama | 396/80 |
| 7,769,285 B2* | 8/2010 | Honjo et al. | 396/101 |
| 7,860,388 B2* | 12/2010 | Tsujimoto | 396/147 |
| 7,868,917 B2* | 1/2011 | Nakamura | 348/208.14 |
| 7,884,874 B2* | 2/2011 | Sugimoto | 348/333.12 |
| 7,945,938 B2* | 5/2011 | Takanezawa et al. | 348/143 |
| 2004/0207743 A1* | 10/2004 | Nozaki et al. | 348/333.12 |
| 2007/0263904 A1* | 11/2007 | Muramatsu | 382/107 |
| 2008/0278589 A1* | 11/2008 | Thorn | 348/208.14 |

FOREIGN PATENT DOCUMENTS

| | | |
|---|---|---|
| JP | 2001-108886 A | 4/2001 |
| JP | 2004-101632 A | 4/2004 |
| JP | 2004-246160 A | 9/2004 |
| JP | 2005-055744 A | 3/2005 |
| JP | 2005-341449 A | 12/2005 |
| JP | 3750499 A | 3/2006 |
| WO | WO 2006082967 A1 * | 8/2006 |

OTHER PUBLICATIONS

Japanese Office Action dated Jan. 17, 2011 (and English translation thereof) in counterpart Japanese Application No. 2006-181470.

\* cited by examiner

*Primary Examiner* — Kevin Bates
(74) *Attorney, Agent, or Firm* — Holtz, Holtz, Goodman & Chick, PC (57) ABSTRACT

Once an imaging mode is set, an imaging apparatus displays a through image with a tracking frame on the predetermined position. If a shutter button is pressed halfway, an object that is overlapped by the tracking frame is recognized as a main subject that a user wants to capture. Until the shutter button is fully pressed or until the halfway-press is released, it is detected where the recognized subject is in frame image data that is captured in sequence, and the tracking frame is displayed based on the detected position. If the halfway press of the shutter button is released before the shutter button is fully pressed, the tracking frame is displayed on the predetermined position. Then if the shutter button is pressed halfway once again, the process is repeated.

15 Claims, 5 Drawing Sheets

IMAGING APPARATUS AND COMPUTER READABLE RECORDING MEDIUM

CROSS-REFERENCE TO RELATED APPLICATIONS

This application is based on Japanese Patent Application No. 2006-181470 filed on Jun. 30, 2006, the entire contents of which are incorporated herein by reference.

BACKGROUND OF THE INVENTION

1. Field of the Invention

The present invention relates to an imaging apparatus and a computer readable recording medium storing a computer program for operating an imaging apparatus, including, in particular, a moving picture capturing means for capturing a moving picture of a subject using an image capturing device and a shutter button that is able to be pressed both halfway and fully, wherein the imaging apparatus tracks a moving subject and recognizes a position of the subject.

2. Description of the Related Art

The following technology is known as a technology for tracking a subject dynamically in an imaging apparatus such as a digital camera. In this technology, if a moving target subject overlaps the zooming frame when capturing a moving image, the zooming frame is controlled to track the moving target subject, and the moving image data within the zooming frame is stored.

This technology makes it possible to have the zooming frame track the moving target subject. However, the case in which the moving target subject goes out of the frame is unexpected. When the moving target subject goes out of the frame, the zooming frame is located on the edge of the image. Therefore, even if a user slightly changes the camera angle so that the zooming frame is set to the target subject, the target subject will go out of the frame again in a moment. Meanwhile, once the tracking has started, the user can not change the tracking target without stopping recording mode. Thus, this known technology has problems in usability.

SUMMARY OF THE INVENTION

According to one aspect of the invention, an imaging apparatus includes: moving picture capturing means for capturing a moving picture of a subject using an image capturing device; first display controlling means for displaying frame data captured in sequence by the moving picture capturing means on a display and for displaying a remarkable point on a predetermined position of the displayed frame data; a shutter button that is adapted to be pressed both halfway and fully; second display controlling means for, when the shutter button is pressed halfway, updating a display position of the remarkable point to a position of the subject so as to track the subject with the remarkable point; and third display controlling means for resetting the display position of the remarkable point to the predetermined position when the halfway-press of the shutter button is released after the shutter button is pressed halfway.

According to the present invention, the remarkable point may be a remarkable area.

According to a further aspect of the invention, a computer readable recording medium stores a computer program, which is executable by a computer to cause the computer to operate an imaging apparatus, wherein the imaging apparatus includes moving picture capturing means for capturing a moving picture of a subject using an image capturing device and a shutter button that is adapted to be pressed both halfway and fully. The computer program causes the computer to execute functions including:: displaying frame data captured in sequence by the moving picture capturing means on a display and displaying a remarkable point on a predetermined position of the displayed frame data; updating a display position of the remarkable point to a position of the subject so as to track the subject with the remarkable point when the shutter button is pressed halfway; and resetting the display position of the remarkable point when the halfway-press of the shutter button is released after the shutter button is pressed halfway.

BRIEF DESCRIPTION OF THE DRAWINGS

The accompanying drawings illustrate preferred embodiments of an imaging apparatus according to the invention, and together with the detailed description of the preferred embodiments given below serve to explain the principles of the invention.

DETAILED DESCRIPTION

Now, an embodiment of the invention will be described in detail with reference to the accompanying drawings using an example in which an imaging apparatus of this invention is applied to a digital camera.

A. The Structure of the Digital Camera

Figure 1:
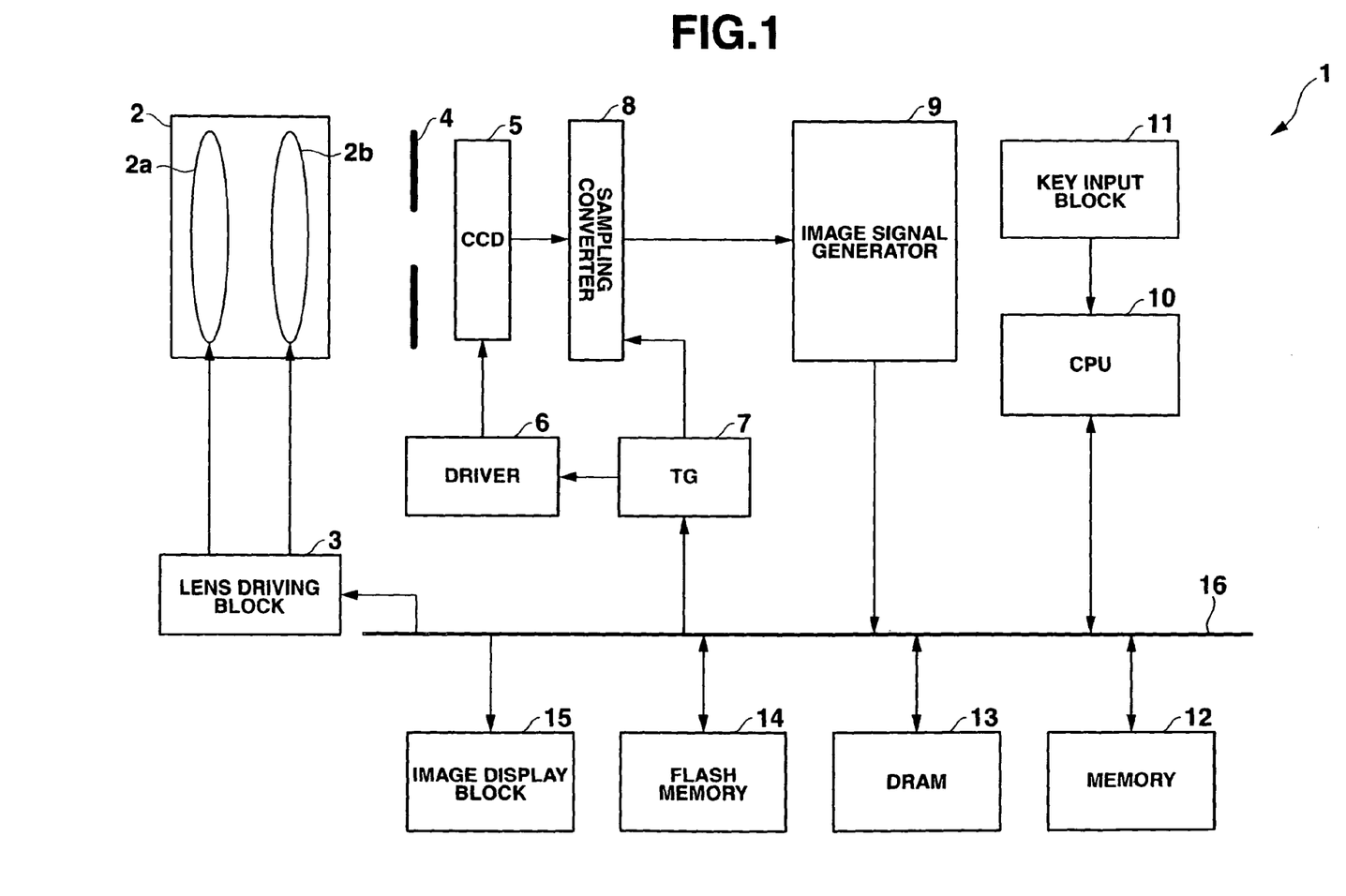
FIG. 1 is a block diagram showing a digital camera as one embodiment of this invention.

FIG. 1 is an electrical block diagram of the digital camera 1, which realizes one embodiment of an imaging apparatus of this invention. The digital camera 1 includes a lens unit 2, a lens driving block 3, an aperture 4, a Charge Coupled Device (CCD) 5, a driver 6, a Timing Generator (TG) 7, a sampling converter 8, an image signal generator 9, a Central Processing Unit (CPU) 10, a key input block 11, a memory 12, a Dynamic Random Access Memory (DRAM) 13, a flash memory 14, an image display block 15, and a bus 16.

The lens unit 2 includes a focus lens group 2a, and a zoom lens 2b. The lens driving block 3 is connected to the lens unit 2. The lens driving block 3 includes a focus motor which drives the focus lens group 2a along the optical axis of the lens, a zoom motor which drives the zoom lens 2b along the optical axis of the lens, and a focus motor driver and a zoom motor driver which drive the focus motor and the zoom motor respectively.

The aperture 4 includes a driving circuit, which drives the aperture 4 by a control signal sent from the CPU 10. The aperture 4 is a mechanism which controls the amount of light entering through the lens unit 2.

The CCD 5, which is driven by the driver 6, outputs a video signal to the sampling converter 8, by executing photoelectric conversion with respect to the intensity of light for each RGB color of the target subject in a constant period. The operating timing of the vertical driver 6 and the sampling converter 8 are controlled by the CPU 10 via the TG 7. Meanwhile, the CCD 5 has Bayer Pattern Color Filter and a function as an electronic shutter. The shutter speed of the electronic shutter is controlled by the CPU 10 via the driver 6 and the TG 7.

The sampling converter 8 is connected to the TG 7 and includes a Correlated Double Sampling (CDS) Circuit, which executes Correlated Double Sampling on the imaging signal outputted from the CCD 5 and stores the result, an Automatic Gain Control (AGC) Circuit, which executes Automatic Gain Control on the imaging signal after the sampling, an A/D Converter, which changes the analog imaging signal after the Automatic Gain Control into a digital signal. The imaging signal outputted from the CCD 5 is sent to the image signal generator 9 as a digital signal via the sampling converter 8.

The image signal generator 9 executes gamma correction, a white balance process and other processes on the imaging signal sent from the sampling converter 8 and generates a luminance/chrominance signal (YUV data). The image data of the generated luminance/chrominance signal is sent to CPU 10. In other words, the image signal generator 9 executes image processing on the image data outputted from the CCD 5.

The CPU 10 executes compression/decompression processing (for example the compression/decompression processing of JPEG/MPEG format) for the image data sent from the image signal generator 9, Auto Focus (AF) processing, and imaging processing. The CPU 10 is a one-chip microcomputer which controls each part of the digital camera 1 and has functions of image-recognition processing for the main target subject, position detection processing for a main target subject and display processing for a tracking frame and a trimming frame.

The key input block 11 includes several operation keys such as a shutter button that can be pressed halfway ("halfway-press") and fully ("full press"), a mode select key, a menu key, an arrow key, a SET key and other keys, and outputs a manipulation signal in accordance with a user's key operation to the CPU 10. The memory 12 stores a control program which is needed for the CPU 10 to control each part, as well as necessary data, and the CPU 10 works in accordance with the program.

The DRAM 13 is used as a buffer memory which temporarily stores the image data, which is sent from the CPU 10 after capturing by the CCD 5. The DRAM 13 is also used as a working memory of the CPU 10. The flash memory 14 is a recording medium which stores compressed image data.

The image display block 15 includes a color LCD and a driving circuit for the LCD. The image display block 15 displays a target subject captured by CCD 5 as a through image in an imaging standby mode, and the image display block 15 displays a recorded image which is read out from the flash memory 14 and decompressed in a recorded image reproducing mode.

B. The Operation of the Digital Camera

The operation of the digital camera 1 in this embodiment will be described with reference to FIG. 2.

Once the imaging mode is set by the user's operation of the mode select key in the key input block 11, the CPU 10 starts a through image displaying process. That is, the CPU 10 starts a process in which: the CCD 5 captures the target subject at a predetermined frame rate, the CPU 10 makes the buffer memory (the DRAM 13) store frame image data of luminance and color-difference signal which is captured in sequence by the CCD 5 and processed by the image signal generator 9, and the CPU 10 displays the sequentially stored image data using the image display block 15 (Step S1). At that time the CPU 10 displays the tracking frame 21 (Observed Position) at a predetermined position of the image display block 15 (here, it is assumed that the predetermined position is the center position) based on predetermined position information which is stored in the memory 12.

Then the CPU 10 judges whether the shutter button is pressed halfway or not (Step S2). The judgment depends on whether or not an operation signal corresponding to the halfway-press of the shutter button is sent from the key input block 11. According to this embodiment, the tracking frame tracks the main subject if a user moves the digital camera so that the main subject, which the user wants to capture, overlaps the tracking frame 21, and presses the shutter button halfway when the tracking frame 21 overlaps the main subject.

If the CPU 10 judges that the shutter button isn't pressed halfway in step S2, it remains in step S2 until the shutter button is pressed halfway. If the CPU 10 judges that the shutter button is pressed halfway, the CPU 10 displays the trimming frame 22 based on the current display position of the tracking frame (the same as the predetermined position at first) (Step S3). In other words, the position of the tracking frame corresponds to the trimming position and therefore the trimming frame is displayed so that the tracking frame is in the center of the trimming frame. Meanwhile, the size of trimming (the size of the trimming frame) is determined previously here, however, it is possible to change the size arbitrarily by an operation of the zoom key.

Figure 3A:
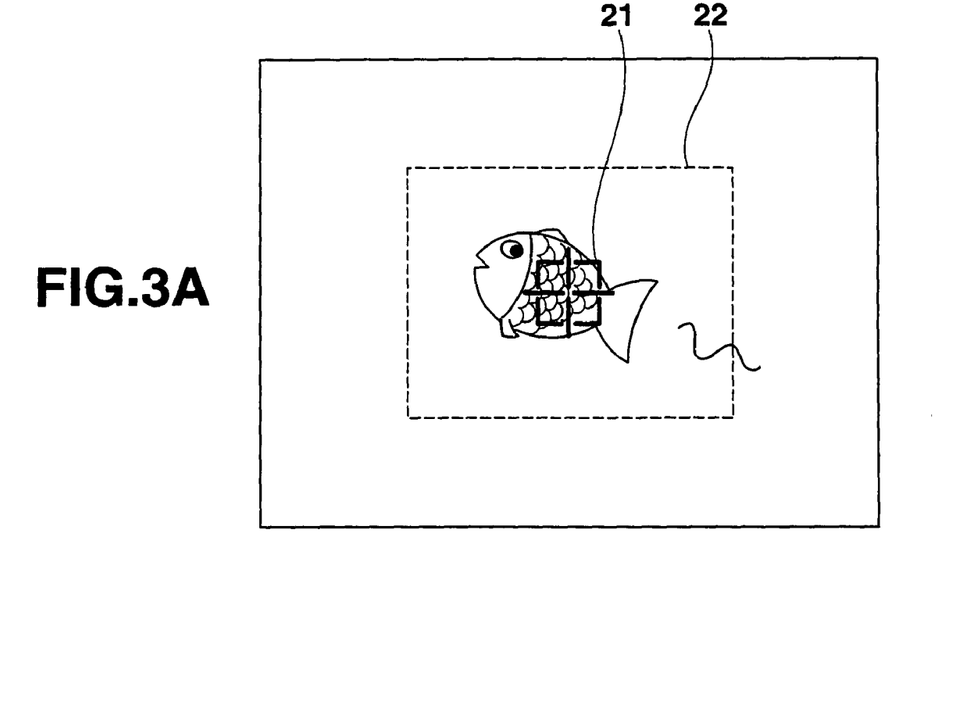
FIG. 3 is a diagram illustrating a tracking frame and a trimming frame displayed by the image display block.

FIG. 3A shows the screen displayed by the image display block 15 when the shutter button is pressed halfway. As shown in FIG. 3A, the tracking frame 21 and the trimming frame 22 are displayed in the center of the screen, and the tracking frame 21 is displayed at the center of the trimming frame 22. Since a fish is overlapped with the tracking frame 21 in this example, the fish is set as the main subject for capturing and the tracking frame tracks the fish automatically.

The CPU 10 recognizes the subject, which is overlapped with the tracking frame 21, in the captured image based on the frame image data which is captured by the CCD 5 when the shutter button is pressed halfway (Step S4). In this example, since the tracking frame 21 is located on the predetermined position, the subject that is located on the predetermined position is recognized. The recognition is performed with an image recognition process and the subject in the predetermined position is recognized. For example, the fish which is located on the tracking frame 21 is recognized when the shutter button is pressed halfway under the condition demonstrated in the FIG. 3A. An explanation of the image recognition process is omitted since it is a publicly known technology.

Then the CPU 10 gets new frame image data captured by the CCD 5 (Step S5) and performs a process for detecting where the recognized main subject (the fish in this example) is in the captured image (Step S6). In other words, by performing image recognition of newly captured frame image data, the position is detected where the recognized main subject is. When the position is detected in this step, the detected position data is stored into position data memory in the buffer memory (DRAM 13), and if a position data is already stored in the position data memory, the stored data is refreshed by replacing the stored data with the new detected position data.

Meanwhile, with regard to the image recognition process for the newly captured frame image data, it is possible to apply the process to the whole image data, or it is also possible to apply the process only to image data surrounding the previous position of the tracking frame (the position of the main subject). Thus, it is possible to reduce the process load of the image recognition process.

CPU 10 judges whether the location of the main target subject is detected or not, that is to say, judges whether a new position data is stored into the position data memory (Step S7). If a new location of the main target subject is detected, CPU 10 updates the display positions of the tracking frame 21 and the trimming frame 22 based on the stored position data. Then the frame image data is displayed on the image display block 15 together with the tracking frame 21 and the trimming frame 22 (Step S8). If the position data of the main target subject is not changed before-and-after the update, the display positions of the tracking frame 21 and the trimming frame 22 are not changed. Additionally, when updating the display positions of the tracking frame 21 and the trimming frame 22, the trimming frame 22 is controlled to move within a field angle of the captured image (sometimes referred to herein as a captured image angle or image angle), and never runs off the edge of the field angle.

On the other hand, if it is determined in Step S7 that the location of the main target subject cannot be detected, CPU 10 displays a message that the target subject has gone out of the frame, along with the frame image data, and goes on to step S10 (Step S9). In this case, the stored data in the position data memory is not updated, the display of the tracking frame 21 and the trimming frame 22 is not updated, and the tracking frame 21 and the trimming frame 22 are displayed on the same position as before.

In step S10, it is judged whether the shutter button is fully pressed or not. If the shutter button isn't fully pressed, it is judged whether the halfway-press of the shutter button is released or not (Step S11). If the halfway-press is not released, the process performed by the CPU 10 goes back to step S5, in which the newly captured frame image data is acquired and the above mentioned process (Steps S5 to S11) is repeated.

FIG. 4 and FIG. 5 show examples of displaying the tracking frame 21 and the trimming frame 22 during the loop from step S5 to step S11. Specifically, FIGS. 4 and 5 show the positioning of the tracking frame 21 and trimming frame 22 which are displayed when the fish, swimming toward the lower left, is captured.

Figure 4A:
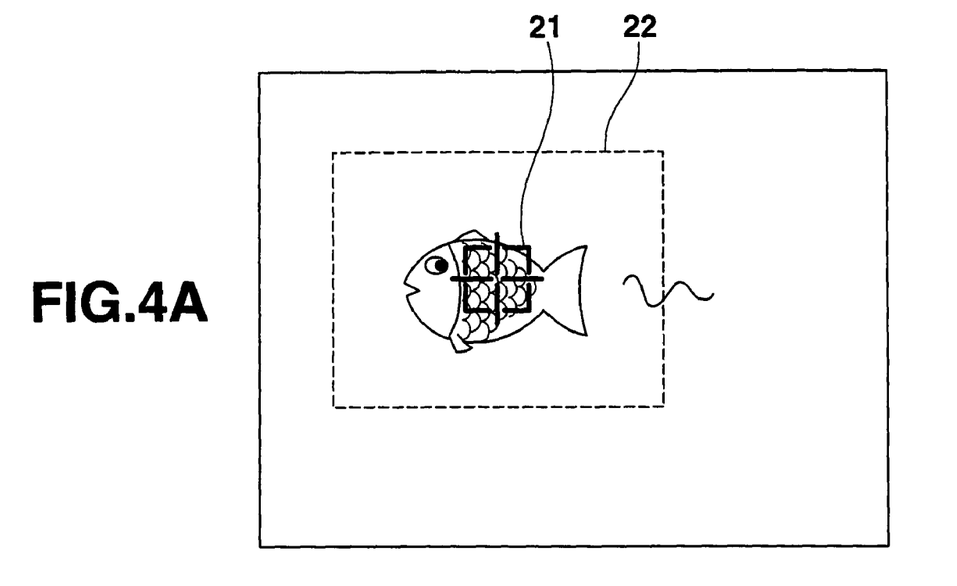
FIG. 4 is a diagram illustrating a tracking frame and a trimming frame displayed by the image display block.
Figure 4B:
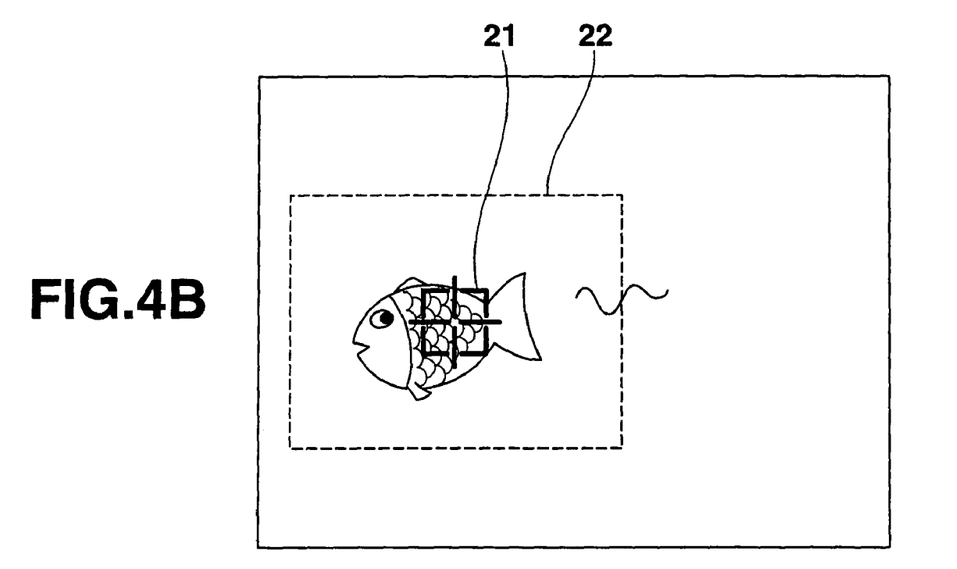
Figure 5C:
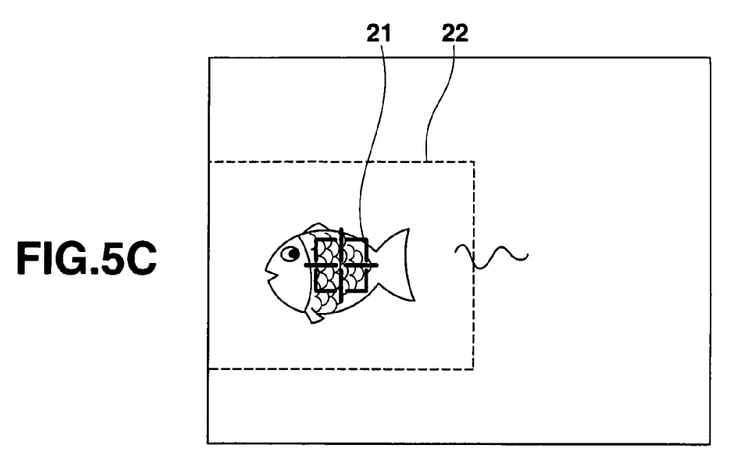
FIG. 5 is a diagram illustrating a tracking frame and a trimming frame displayed by the image display block.

The tracking frame 21 and the trimming frame 22 are moved toward the lower left together with the moving of the main subject, the fish, from the image shown in FIG. 3A, in which the shutter button is pressed halfway, to FIG. 5C via FIG. 4A and FIG. 4B. In FIG. 5C, the left side of the trimming frame 22 is bounded by the captured image angle. Therefore, the trimming frame 22 doesn't move any farther to the left even if the fish moves still more left. Thus, the trimming frame 22 moves within the range of the image angle, following the position of the tracking frame 21 and the main target subject. For example, the trimming frame 22 doesn't move upward any more if the upper side of the trimming frame 22 is bounded by the image angle.

Figure 5D:
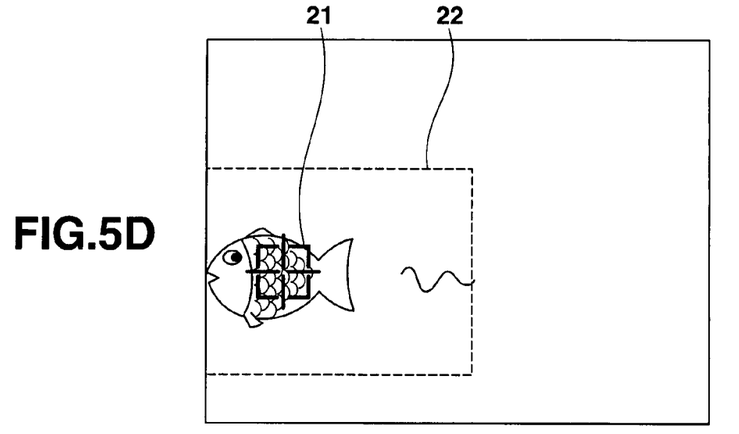

Additionally, if the fish moves still more lower left as shown in FIG. 5D, the trimming frame 22 only moves downward and the tracking frame 21 moves together with the moving of the main target subject. And then if the main target subject, the fish, goes out of the frame (a judgment is made in Step S7 that the position of the target subject cannot be detected), the notice that the target subject has gone out of the frame is displayed and the tracking frame 21 and the trimming frame 22 are displayed on the same position as before. In other words, when the target subject leaves the frame, the tracking frame 21 (and the trimming frame 22) does not move and is displayed without change.

Figure 2:
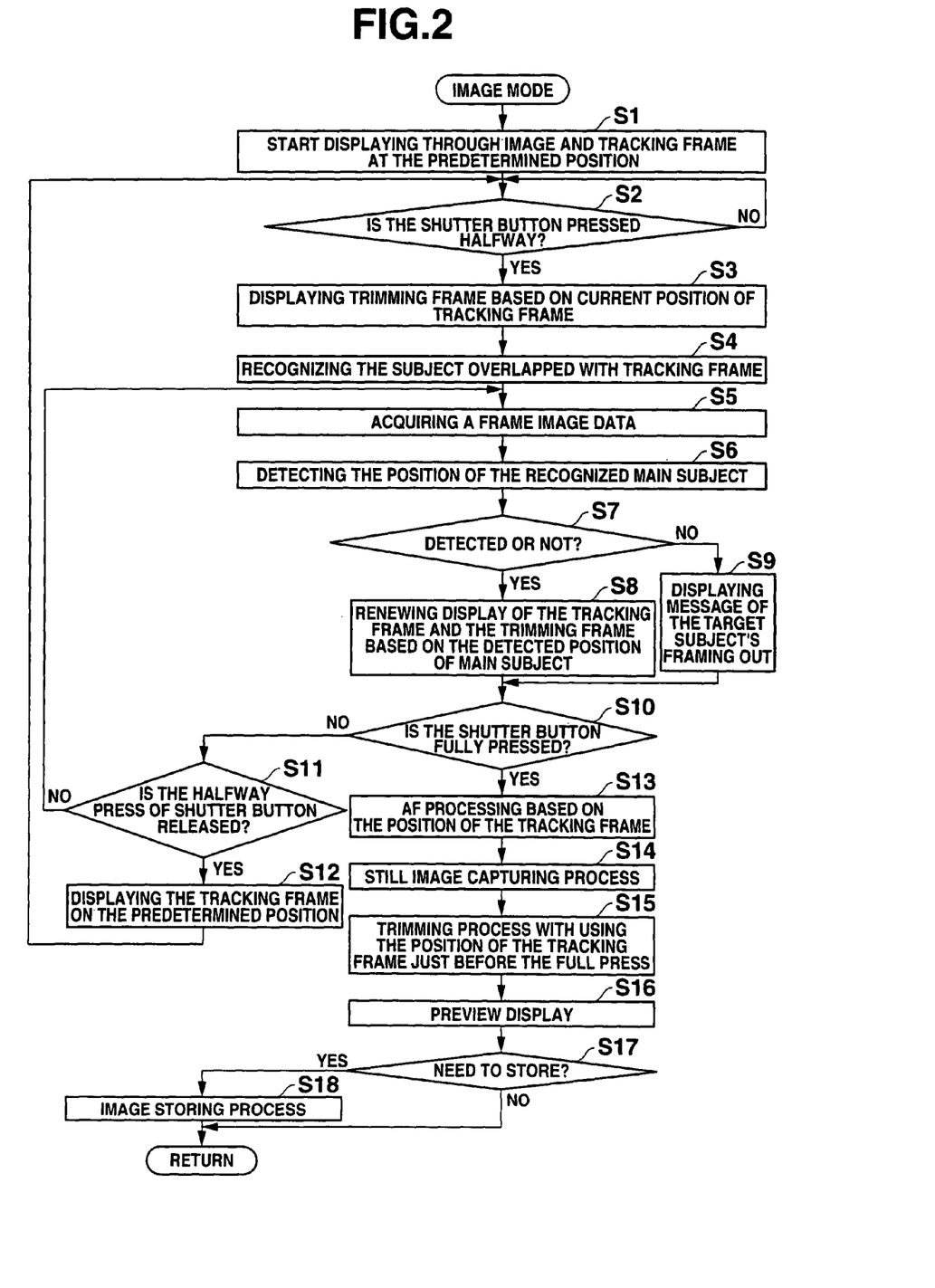
FIG. 2 is a flowchart for explaining operation of a digital camera of this embodiment.
Figure 3B:
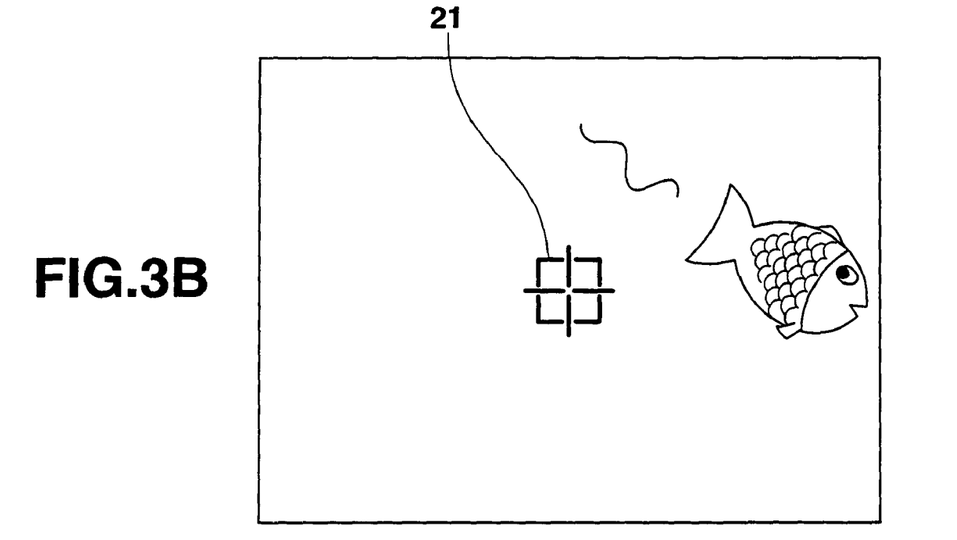

Going back to the flowchart shown in FIG. 2, if it is judged that the halfway-press is released in step S11, the CPU 10 displays the tracking frame 21 on the predetermined position (the center position) based on the predetermined position information which is stored in the memory 12, and goes back to step S2 (Step S12). In this case, the detected position information which is stored in the position data memory in the buffer memory is cleared. FIG. 3B shows the screen image that is displayed on the image display block 15 when the halfway-press of the shutter button is released.

When the halfway-press of the shutter button is released, the tracking frame 21 doesn't track the target subject and is displayed in the center of the screen, as shown in FIG. 3B. In addition, when the shutter button is released from the halfway-press, CPU 10 stops displaying the trimming frame 22. If a user wants to change the main target subject or the main target subject goes out of the frame, the user can simply release the halfway-press of the shutter button. As a result of this operation, the track frame 21 returns to its normal location (e.g., the center of the image in this embodiment). Therefore, the user can restart the operation to track the main target subject from the beginning.

Figure 5E:
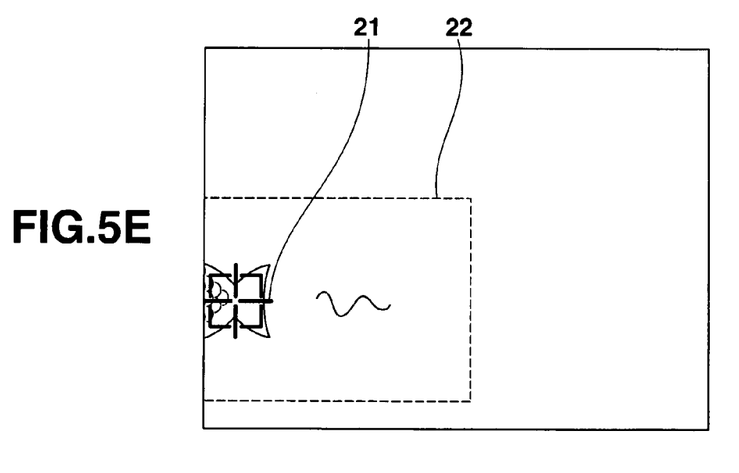

By contrast, if, for example the position of the tracking frame 21 is not changed when the halfway-press of the shutter button is released, the tracking frame 21 is left displayed on the edge of the image when the main target subject goes out of the frame (FIG. 5E). Thus, if a user tries to make the tracking frame 21 track the main target subject by overlapping the tracking frame 21, which is displayed on edge, with the main target subject and pressing the shutter button halfway, the main target subject is likely to go out of the frame again quickly.

In addition, if the position of the tracking frame 21 is not changed when the halfway-press of the shutter button is released, if a user wants to change the main target subject, it is necessary for the user to release the halfway-press when the tracking frame 21 is displayed not on the edge of the image but rather when the tracking frame is displayed on a position which is convenient for capturing and tracking for the main target subject so as to eliminate the above problem. Thus, it is impossible to deal with the case in which the user wants to capture the image immediately. Therefore it is desirable to solve the above problem. In the aspect of this invention described above, it is possible to cope well with the above problem by displaying the tracking frame 21 on the predetermined position (e.g., the center of the image) when the halfway-press of the shutter button is released.

If it is judged that the shutter button is fully pressed in step S10, the CPU 10 performs AF processing within a given AF area based on the position of the tracking frame (the position information stored in the position data memory) (Step S13). Next the CPU 10 performs the capturing process of a still image (Step S14), and performs the trimming process on the still image which is captured in the capturing process using the position of the tracking frame 21 just before the full press of the shutter button (the position information stored in the position data memory) and the predetermined trimming size (Step S15).

Next the CPU 10 displays, as a preview display, the image data trimmed by the trimming process (Trimming Image Data) using the image display block 15 (Step S16), and judges whether the trimming image data is to be stored or not (Step S17). At that time, a screen display for assigning whether the trimming image data is to be stored or not is displayed together with the preview display. If the user assigns the image to be stored by an operation of the key input block 11, it is determined that the image will be stored. If the user assigns not to store the image, it is determined that the image will not be stored. If it is judged in step S17 that the image will be stored, the trimming image data is compressed and stored into the flash memory 14 (Step S18).

C. Summary of Operation of the Above-Described Embodiment

As described above, in this embodiment, once the imaging mode is set, the through image is displayed with a tracking frame 21 on the predetermined position. And if a shutter button is pressed halfway when the tracking frame 21 overlaps the main subject which a user wants to capture, the subject, which is overlapped with the tracking frame 21, is recognized. As long as the shutter button is pressed halfway, the tracking frame 21 is displayed and tracked to the recognized main target subject. If the halfway-press of the shutter button is released, the tracking frame 21 is displayed on the predetermined position. This allows the present invention to deal with the case in which the main target subject goes out of the frame or the case in which a user wants to change the main target subject, by releasing the halfway-press of the shutter button, thereby releasing the tracking of the subject with the tracking frame 21. For example, if the main target subject goes out of the frame, the tracking frame is still displayed if the halfway-press of the shutter button is released, and is moved to the predetermined position (e.g., the center of the screen). Therefore, the tracking frame 21 can be overlapped on the main target subject while the tracking frame is in the predetermined position, and it is unnecessary to overlap the tracking frame 21 to the main target subject while the tracking frame 21 is on the side of the screen.

D. Other Embodiments

It is possible to change the above mentioned embodiment using the following modifications, for example.

(1) In the above mentioned embodiment, the AF processing and the trimming processing are performed based on the position of the tracking frame 21. However, it is possible to select one of the processing, the AF processing and the trimming processing. In this case, it is possible to display either the AF area or the trimming area only instead of the tracking frame. The AF area and/or the trimming area, which is displayed as a substitution for the tracking frame 21, are generically named "Remarkable Area".

(2) In the above mentioned embodiment, the AF processing is performed after the full press of the shutter button. However, it is possible to perform the AF processing after the halfway-press of the shutter button using the AF area based on the position of the tracking frame (the predetermined position).

(3) In the above mentioned embodiment, if the target subject goes out of the frame (it is judged that the location of the main target subject can't be detected in step S7), a message that the target subject has gone out of the frame (framing out) is displayed (Step S9). However, it is possible not to display the message of the framing out of the target subject, because the user can recognize the framing out of the target subject by watching the image display block 15.

(4) In the above mentioned embodiment, the main subject, which is overlapped with the tracking frame 21, is recognized by using an image recognition process in the step S4 and it is detected where the recognized main subject is in the newly captured frame image data. However, it is possible to detect the position of the main subject in the image by using a technique which detects the motion vector of the main subject, instead of the image recognition process. It is sufficient to practice this aspect of the present invention using a method to be able to detect the position of the main subject in the frame image data.

(5) It is possible to use a dot, a circle or an x-mark instead of the tracking frame 21 in the above embodiment. That is, it is sufficient to provide a method for user to be able to catch the position for detecting the main subject and/or the current position of the recognized main subject. The display of a point, which makes a user catch the position for detecting the main subject and/or the current position of the recognized main subject, for example the tracking frame 21, a dot, a circle and/or an x-mark, are generically called "Remarkable Point".

(6) Meanwhile, if the shutter button is fully pressed suddenly without staying in the halfway-pressed stage, it is possible to process the AF processing based on the tracking frame on the predetermined position, process the capturing process of a still image, and then store the still image data captured by the image capturing process. In such case, it is also possible to generate a trimming image data of the still image data captured by the image capturing process using the tracking frame, which is in the predetermined position, and store it.

(7) In addition, it is possible for a user to change the size of the trimming area (trimming size) arbitrarily.

(8) It is also possible to combine an arbitrary number of the above modifications (1) to (7).

The digital camera 1 described above is not limited to the above mentioned embodiment. This invention may be used in various devices such as mobile terminal devices with cameras, personal computers with cameras, IC recorders with cameras, and/or digital video cameras. The present invention may be practiced in any device having a function for capturing an image of a subject.

What is claimed is:

1. An imaging apparatus comprising:
   moving picture capturing means for capturing a moving picture of a subject using an image capturing device;
   first display controlling means for displaying frame data captured in sequence by the moving picture capturing means on a display and for displaying a remarkable point on a predetermined position of the displayed frame data;
   a shutter button that is adapted to be pressed both halfway and fully;
   second display controlling means for, when the shutter button is pressed halfway, displaying the remarkable point on a position of the subject so as to track the subject with the remarkable point;
   trimming frame displaying means for displaying, on the display, a trimming frame which indicates an area for trimming; and
   third display controlling means for changing the position of the remarkable point from the position of the subject to the predetermined position when the halfway-press of the shutter button is released after the shutter button is pressed halfway;
   wherein the trimming frame displaying means updates a display position of the trimming frame such that the trimming frame tracks the subject in accordance with the tracking performed by the second display controlling means; and
   wherein when the subject goes out of a frame of the moving picture, the second display controlling means continuously displays the remarkable point on a position at which the subject was located immediately before going out of the frame.

2. The imaging apparatus according to claim 1, further comprising:
   still image capturing means for capturing still image data of the subject using the image capturing device when the shutter button is fully pressed.

3. The imaging apparatus according to claim 2, further comprising:

auto-focus controlling means for executing an auto-focus process with respect to the subject located on the position of the remarkable point,
wherein the auto-focus controlling means executes the auto-focus process with respect to the subject located on the position of the remarkable point at least one of: after the shutter button is pressed halfway and after the shutter button is fully pressed.

4. The imaging apparatus according to claim 2, wherein, when the shutter button is fully pressed, the still image capturing means captures still image data of the moving picture which lies within the trimming frame using the image capturing device.

5. The imaging apparatus according to claim 3, wherein the still image capturing means captures the still image data of the subject after the auto-focus process is executed by the auto-focus controlling means when the shutter button is fully pressed.

6. The imaging apparatus according to claim 5, further comprising:
trimming means for trimming the still image data captured by the still image capturing means based on the position of the trimming frame when the shutter button is fully pressed.

7. The imaging apparatus according to claim 1, wherein when the subject goes out of a frame of the moving picture, the second display controlling means displays a message notifying of the framing out of the subject.

8. The imaging apparatus according to claim 1, further comprising:
subject position recognizing means for recognizing, as the subject, an object at the predetermined position in the displayed frame data when the shutter button is pressed halfway, and for recognizing the position of the subject in each said frame data captured in sequence by the moving picture capturing means, using the frame data captured by the moving picture capturing means,
wherein the second display controlling means displays the remarkable point in each said display frame data at the position of the subject recognized in sequence by the subject position recognizing means.

9. The imaging apparatus according to claim 1, wherein the trimming frame displaying means displays such that the trimming frame tracks in accordance with the position of the remarkable point within an image angle of the frame data captured by the moving picture capturing means.

10. An imaging apparatus comprising:
moving picture capturing means for capturing a moving picture of a subject using an image capturing device;
first display controlling means for displaying frame data captured in sequence by the moving picture capturing means on a display and for displaying a remarkable area on a predetermined position of the displayed frame data;
a shutter button that is adapted to be pressed both halfway and fully;
second display controlling means for, when the shutter button is pressed halfway, displaying the remarkable area at a position of the subject so as to track the subject with the remarkable area;
trimming means for trimming the still image data captured by the still image capturing means; and
third display controlling means for changing the position of the remarkable area from the position of the subject to the predetermined position when the halfway-press of the shutter button is released after the shutter button is pressed halfway;
wherein the remarkable area indicates an area to be trimmed by the trimming means, and the trimming means trims the still image data based on the position of the remarkable area when the shutter button is fully pressed; and
wherein when the subject goes out of a frame of the moving picture, the second display controlling means continuously displays the remarkable area on a position at which the subject was located immediately before going out of the frame.

11. The imaging apparatus according to claim 10, further comprising:
auto-focus controlling means for executing an auto-focus process with respect to the subject at least one of: after the shutter button is pressed halfway and after the shutter button is fully pressed,
wherein the remarkable area is an auto-focus area, and the auto-focus controlling means executes the auto-focus processing with respect to the subject within the auto-focus area.

12. The imaging apparatus according to claim 10, further comprising:
still image capturing means for capturing still image data of the subject using the image capturing device when the shutter button is fully pressed.

13. The imaging apparatus according to claim 10, wherein the second display controlling means displays the remarkable area, as a trimming frame, at the position of the subject so as to track the subject, within an image angle of the frame data which is captured by the moving picture capturing means.

14. The imaging apparatus according to claim 13, further comprising trimming size assigning means for determining a trimming size,
wherein the trimming means trims the still image data captured by the still image capturing means based on the trimming size determined by the trimming size assigning means.

15. A non-transitory computer readable recording medium storing a computer program which is executable by a computer to cause the computer to operate an imaging apparatus, the imaging apparatus including moving picture capturing means for capturing a moving picture of a subject using an image capturing device and a shutter button that is adapted to be pressed both halfway and fully, the program causing the computer to execute functions comprising:
displaying frame data captured in sequence by the moving picture capturing means on a display and displaying a remarkable point on a predetermined position of the displayed frame data;
displaying the remarkable point on a position of the subject so as to track the subject with the remarkable point when the shutter button is pressed halfway;
displaying, on the display, a trimming frame which indicates an area for trimming; and
changing the position of the remarkable point from the position of the subject to the predetermined position when the halfway-press of the shutter button is released after the shutter button is pressed halfway;
wherein a display position of the trimming frame is updated such that the trimming frame tracks in accordance with the tracking of the subject; and
wherein when the subject goes out of a frame of the moving picture, the remarkable point is continuously displayed on a position at which the subject was located immediately before going out of the frame.

* * * * *